(12) United States Patent
Ahn et al.

(10) Patent No.: US 8,929,326 B2
(45) Date of Patent: Jan. 6, 2015

(54) METHOD AND DEVICE FOR TRANSMITTING ACKNOWLEDGEMENT IN WIRELESS COMMUNICATION SYSTEM

(75) Inventors: Joon Kui Ahn, Anyang-si (KR); Suck Chel Yang, Anyang-si (KR); Min Gyu Kim, Anyang-si (KR); Dong Youn Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 13/703,710

(22) PCT Filed: Jun. 16, 2011

(86) PCT No.: PCT/KR2011/004419
§ 371 (c)(1),
(2), (4) Date: Dec. 12, 2012

(87) PCT Pub. No.: WO2011/159110
PCT Pub. Date: Dec. 22, 2011

(65) Prior Publication Data
US 2013/0083709 A1    Apr. 4, 2013

Related U.S. Application Data

(60) Provisional application No. 61/355,541, filed on Jun. 16, 2010.

(51) Int. Cl.
*H04W 4/00* (2009.01)
*H04W 72/04* (2009.01)
*H04L 1/16* (2006.01)
*H04W 72/02* (2009.01)
*H04L 1/18* (2006.01)
*H04L 5/00* (2006.01)
*H04W 28/04* (2009.01)

(52) U.S. Cl.
CPC ............ *H04W 72/042* (2013.01); *H04L 1/1607* (2013.01); *H04W 72/02* (2013.01); *H04L 1/1861* (2013.01); *H04L 5/001* (2013.01); *H04L 5/0016* (2013.01); *H04L 5/0055* (2013.01); *H04W 28/04* (2013.01)
USPC ............ 370/330; 370/328; 370/329; 370/436

(58) Field of Classification Search
None
See application file for complete search history.

(56) References Cited

U.S. PATENT DOCUMENTS

| 2010/0027454 | A1* | 2/2010 | Hou et al. ................. 370/312 |
| 2011/0141878 | A1* | 6/2011 | Che et al. ................. 370/216 |
| 2011/0243066 | A1* | 10/2011 | Nayeb Nazar et al. ....... 370/328 |
| 2011/0310819 | A1* | 12/2011 | Liao ......................... 370/329 |

OTHER PUBLICATIONS

3GPP TSG RAN WG1 #59bis, R1-100215, Jan. 2010, Valencia, Spain, pp. 1-5.*
3GPP TSG RAN WG1 #59bis, R1-100012, Jan. 2010, Valencia, Spain, pp. 1-4.*

(Continued)

*Primary Examiner* — Donald Mills
(74) *Attorney, Agent, or Firm* — Birch, Stewart, Kolasch & Birch, LLP

(57) ABSTRACT

Disclosed are a method and a device for transmitting an acknowledgement. A terminal receives at least one downlink transport block from at least one serving cell. The terminal selects one of an explicit resource and an implicit resource, and transmits an acknowledgement for at least one said downlink transport block by using the selected resource.

15 Claims, 12 Drawing Sheets

(56) References Cited

OTHER PUBLICATIONS

3GPP TSG RAN WG1 #59bis, R1-100521, Jan. 2010, Valencia, Spain, pp. 1-4.*

R1-081257, 3GPP TSG RAN WG1 Meeting #52bis, LG Electronics, "Uplink ACK/NACK resource allocation in TDD", Mar. 31-Apr. 4, 2008, Shenzhen, China, pp. 1-5.

R1-101468, 3GPP TSG RAN1 #60, Motorola, "Uplink ACK/NACK for Carrier Aggregation", Feb. 22-26, 2010, San Francisco, USA, pp. 1-3.

R1-103397, 3GPP TSG RAN WG1 Meeting #61, LG Electronics, "ACK/NACK resource allocation in LTE-A", May 10-14, 2010, Montreal, Canada, pp. 1-5.

* cited by examiner

METHOD AND DEVICE FOR TRANSMITTING ACKNOWLEDGEMENT IN WIRELESS COMMUNICATION SYSTEM

This application is the National Phase of PCT/KR2011/004419 filed on Jun. 16, 2011, which claims priority under U.S.C. 119(e) to the U.S. Provisional Application No. 61/355,541 filed on Jun. 16, 2010, all of which are hereby expressly incorporated by reference into the present application.

TECHNICAL FIELD

The present invention relates to wireless communications, and more particularly, to a method and apparatus for transmitting a reception acknowledgement in a wireless communication system.

BACKGROUND ART

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of an uplink control signal such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. The component carrier is defined with a center frequency and a bandwidth. One uplink component carrier and one downlink component carrier are mapped to one cell. When a user equipment receives a service by using a plurality of downlink component carriers, it can be said that the user equipment receives the service from a plurality of serving cells.

With the introduction of the carrier aggregation and the MIMO, it is required to increase capacity of a control channel. The increase in the number of downlink transport blocks that can be transmitted in one transmission time interval (TTI) results in the increase in the number of bits of an HARQ ACK/NACK signal for the downlink transport blocks. For example, if 8 downlink transport blocks are transmitted, it is necessary to transmit an 8-bit HARQ ACK/NACK signal.

In the 3GPP LTE, the PUCCH structure is designed on the basis of a 2-bit HARQ ACK/NACK signal. Therefore, it is required to design a PUCCH for carrying an HARQ ACK/NACK signal having the increased number of bits.

In addition, a great number of transport blocks are not always transmitted. Therefore, if the control channel is designed according to maximum capacity, it may be ineffective to transmit an ACK/NACK signal having a small bit size.

There is a need to design the control channel to have high reliability with respect to an ACK/NACK signal having a variable bit size.

SUMMARY OF INVENTION

Technical Problem

The present invention provides a method and apparatus for determining a resource for a reception acknowledgement when a plurality of serving cells are present, and for transmitting the reception acknowledgement by using the determined resource.

Technical Solution

In an aspect, a method of transmitting a reception acknowledgement in a wireless communication system is provided. The method includes receiving by a user equipment at least one downlink transport block from at least one serving cell, selecting, by the user equipment, one of an explicit resource and an implicit resource and transmitting, by the user equipment, a reception acknowledgement for the at least one downlink transport block by using the selected resource. The explicit resource is acquired from a downlink resource allocation used to receive the at least one downlink transport block, and the implicit resource is acquired from a resource used to receive a control channel for the downlink resource allocation.

The selecting of at least one of the explicit resource and the implicit resource may include upon receiving the at least one downlink transport block from one serving cell, selecting the implicit resource.

The serving cell may be a primary cell.

The selecting of one of the explicit resource and the implicit resource may include upon receiving the at least one downlink transport block from a plurality of serving cell, selecting the explicit resource.

In another aspect, a user equipment for transmitting a reception acknowledgement in a wireless communication system is provided. The user equipment includes a radio frequency (RF) unit configured to transmit and receive a radio signal, and a processor operatively coupled to the RF unit and configured to receive at least one downlink transport block from at least one serving cell, select one of an explicit resource and an implicit resource and transmit a reception acknowledgement for the at least one downlink transport block by using the selected resource. The processor is configured to acquire the explicit resource from a downlink resource allocation used for transmission of the at least one downlink transport block, and acquire the implicit resource from a resource used for transmission of a control channel for the downlink resource allocation.

Advantageous Effects

When a plurality of serving cells are present, a proper uplink control channel can be determined according to channel capacity required for transmission of a reception acknowledgment.

A resource for an uplink control channel can be more effectively determined in a time division duplex (TDD) system for transmitting a reception acknowledgement in one uplink subframe linked for a plurality of downlink subframes.

MODE FOR INVENTION

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
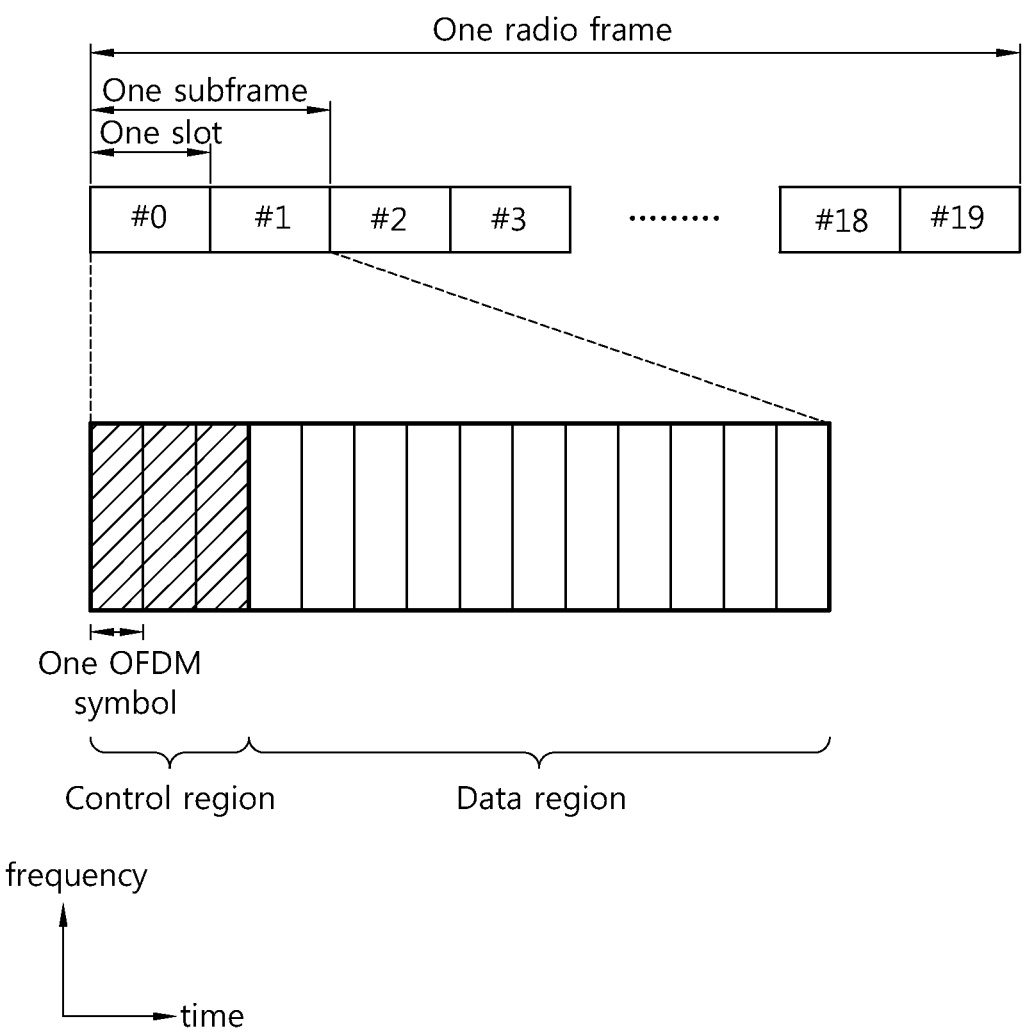
FIG. 1 shows a downlink radio frame structure in $3^{rd}$ generation partnership project (3GPP) long term evolution (LTE).

FIG. 1 shows a downlink radio frame structure in $3^{rd}$ generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 20 slots indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing cyclic redundancy check (CRC) error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
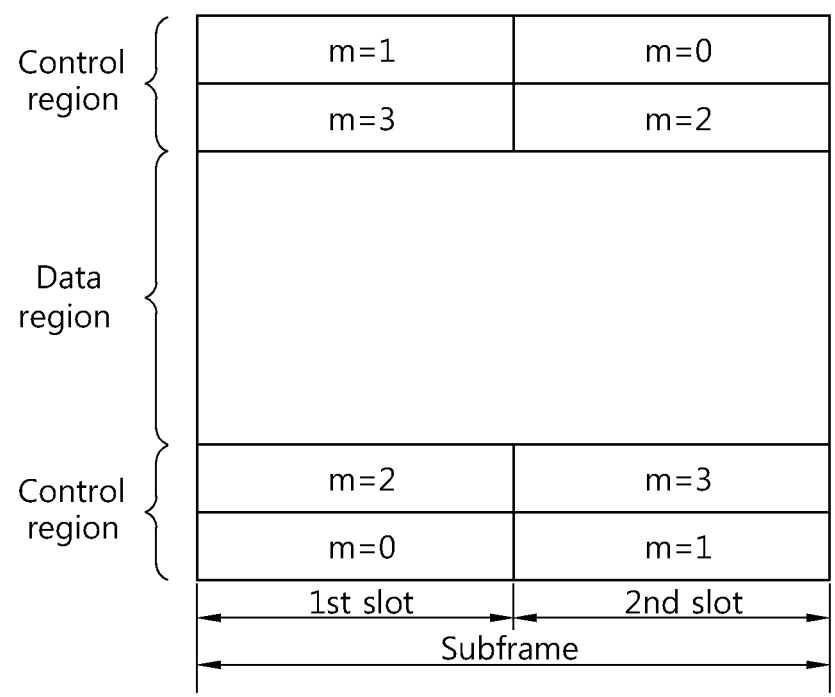
FIG. 2 shows an example of an uplink subframe in 3GPP LTE.

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a 1$^{st}$ slot and a 2$^{nd}$ slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 1 below shows an example of a modulation scheme and the number of bits per subframe according to the PUCCH format.

TABLE 1

| PUCCH format | Modulation scheme | Number of bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4}$$ [Equation 1]

In Equation 1, u denotes a root index, and n denotes a component index in the range of $0 \leq n \leq N-1$, where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence $r(n, I_{cs})$.

$$r(n, I_{cs}) = r(n) \cdot \exp\left(\frac{j2\pi I_{cs} n}{N}\right), 0 \leq I_{cs} \leq N-1$$ [Equation 2]

In Equation 2, $I_{cs}$ denotes a CS index indicating a CS amount ($0 \leq I_{cs} \leq N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in PUCCH formats 1a/1b will be described.

Figure 3:
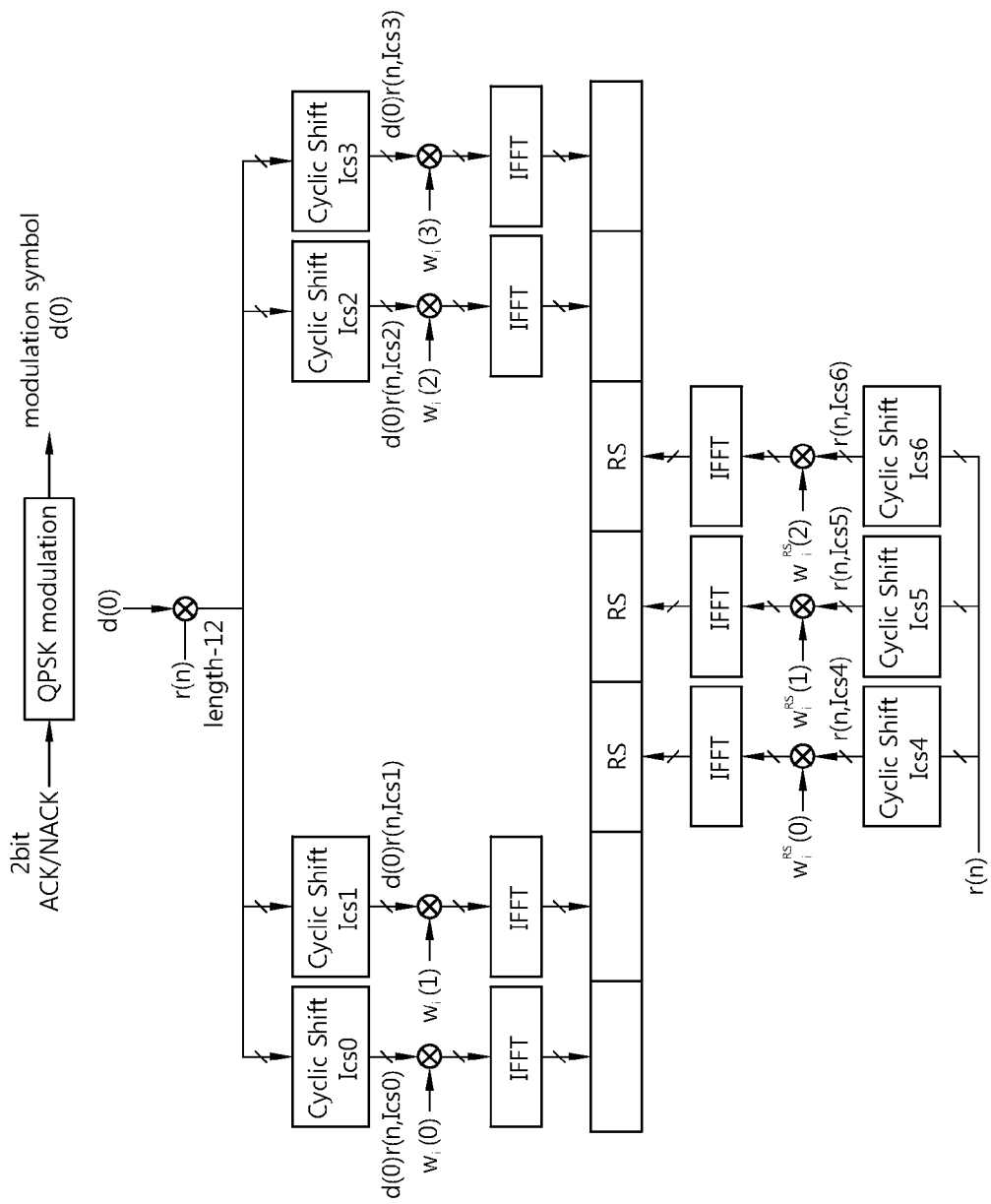
FIG. 3 shows a physical uplink control channel (PUCCH) format 1b in a normal cyclic prefix (CP) in 3GPP LTE.

FIG. 3 shows a PUCCH format 1b in a normal CP in 3GPP LTE.

One slot includes 7 OFDM symbols. Three OFDM symbols are used as reference signal (RS) OFDM symbols for a reference signal. Four OFDM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index l in a slot.

In the normal CP, there are four data symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n, I_{cs})$. When a one-dimensionally spread sequence mapped to an $(i+1)^{th}$ OFDM symbol in a subframe is denoted by m(i), it can be expressed as follows.

$$\{m(0),m(1),m(2),m(3)\}=\{d(0)r(n,I_{cs0}),d(0)r(n,I_{cs1}),d(0)r(n,I_{cs2}),d(0)r(n,I_{cs3})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spread factor K=4 uses the following sequence.

TABLE 2

| Index (i) | [$w_i(0)$, $w_i(1)$, $w_i(2)$, $w_i(3)$] |
| --- | --- |
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 3

| Index (i) | [$w_i(0)$, $w_i(1)$, $w_i(2)$] |
| --- | --- |
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, a two-dimensionally spread sequences {s(0), s(1), s(2), s(3)} can be expressed as follows.

$$\{s(0),s(1),s(2),s(3)\}=\{w_i(0)m(0),w_i(1)m(1),w_i(2)m(2),w_i(3)m(3)\}$$

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences $r(n, I_{cs4})$, $r(n,I_{cs5})$, and $r(n,I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index $n^{(1)}_{PUUCH}$ is defined in order for the UE to obtain the three parameters for configuring the PUCCH. The resource index $n^{(1)}_{PUUCH}$ is defined to $n_{CCE}+N^{(1)}_{PUUCH}$, where $n_{CCE}$ is an index of a first CCE used for transmission of corresponding DCI (i.e., DL resource allocation used to receive DL data mapped to an ACK/NACK signal), and $N^{(1)}_{PUUCH}$ is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index $I_{cs}$, a resource block index m, and an index for obtaining the three indices. The ACK/NACK resource may include at least one of an orthogonal sequence, a cyclic shift, a resource block, and a combination thereof.

Figure 4:
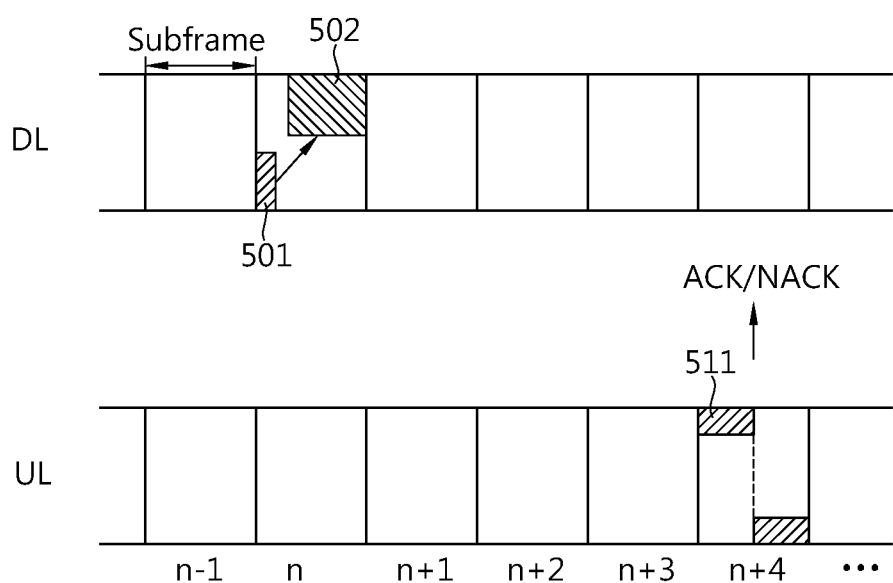
FIG. 4 shows an example of performing hybrid automatic repeat request (HARQ).

FIG. 4 shows an example of performing HARQ.

By monitoring a PDCCH, a UE receives a DL resource allocation on a PDCCH 501 in an $n^{th}$ DL subframe. The UE receives a DL transport block through a PDSCH 502 indicated by the DL resource allocation.

The UE transmits an ACK/NACK signal for the DL transport block on a PUCCH 511 in an $(n+4)^{th}$ UL subframe. The ACK/NACK signal can be regarded as a reception acknowledgement for a DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is $n_{CCE}$, and the resource index is determined as $n^{(1)}_{PUUCH}=n_{CCE}+N^{(1)}_{PUUCH}$.

Now, ACK/NACK transmission in 3GPP LTE time division duplex (TDD) will be described.

TDD differs from frequency division duplex (FDD) in that a UL subframe and a DL subframe coexist in one radio frame. In general, the number of UL subframes is less than the number of DL subframes. Therefore, since UL subframes for transmitting an ACK/NACK signal are insufficient, it is supported to transmit a plurality of ACK/NACK signals for a plurality of DL transport blocks in one UL subframe. According to the section 10.1 of 3GPP TS 36.213 V8.7.0 (2009-05), two ACK/NACK modes, i.e., channel selection and bundling, are introduced.

First, bundling is an operation in which ACK is transmitted when decoding of all PDSCHs (i.e., DL transport blocks) received by a UE is successful, and otherwise NACK is transmitted.

Second, channel selection is also called ACK/NACK multiplexing. The UE transmits ACK/NACK by selecting a plurality of reserved PUCCH resources.

Assume that M DL subframes are linked to a UL subframe n, where M=3.

Since three PDCCHs can be received from three DL subframes, the UE can acquire three PUCCH resources $n^{(1)}_{PUCCH,0}$, $n^{(1)}_{PUCCH,1}$, and $n^{(1)}_{PUCCH,2}$. An example of channel selection is shown in Table 4 below.

TABLE 4

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |
| ACK, NACK/DTX, NACK/DTX | $n^{(1)}_{PUCCH,0}$ | 0, 1 |
| NACK/DTX, ACK, ACK | $n^{(1)}_{PUCCH,2}$ | 1, 0 |
| NACK/DTX, ACK, NACK/DTX | $n^{(1)}_{PUCCH,1}$ | 0, 0 |
| NACK/DTX, NACK/DTX, ACK | $n^{(1)}_{PUCCH,2}$ | 0, 0 |
| DTX, DTX, NACK | $n^{(1)}_{PUCCH,2}$ | 0, 1 |
| DTX, NACK, NACK/DTX | $n^{(1)}_{PUCCH,1}$ | 1, 0 |
| NACK, NACK/DTX, NACK/DTX | $n^{(1)}_{PUCCH,0}$ | 1, 0 |
| DTX, DTX, DTX | N/A | N/A |

HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe. According to Table 3 above, there are three PUCCH resources $n^{(1)}_{PUCCH,0}$, $n^{(1)}_{PUCCH,1}$, and $n^{(1)}_{PUCCH,2}$, and b(0) and b(1) are two bits transmitted by using a selected PUCCH.

For example, if the UE successfully receives three DL transport blocks in three DL subframes, the UE transmits bits (1,1) on the PUCCH by using $n^{(1)}_{PUCCH,2}$. If the UE fails to decode the DL transport block and succeeds in the decoding of the remaining transport blocks in a $1^{st}$ (i=0) DL subframe, the UE transmits bits (1,0) on the PUCCH by using $n^{(1)}_{PUCCH,2}$.

In channel selection, NACK and DTX are coupled if there is at least one ACK. This is because all ACK/NACK states cannot be expressed by combining a reserved PUCCH resource and a QPSK symbol. However, if the ACK does not exist, the DTX is decoupled from the NACK.

The conventional PUCCH format 1b can transmit only 2-bit ACK/NACK. However, channel selection links the allocated PUCCH resources and an actual ACK/NACK signal and thus expresses more ACK/NACK states.

Meanwhile, in addition to the PUCCH format of the conventional 3GPP LTE, there is an ongoing discussion on a PUCCH format 3.

Figure 5:
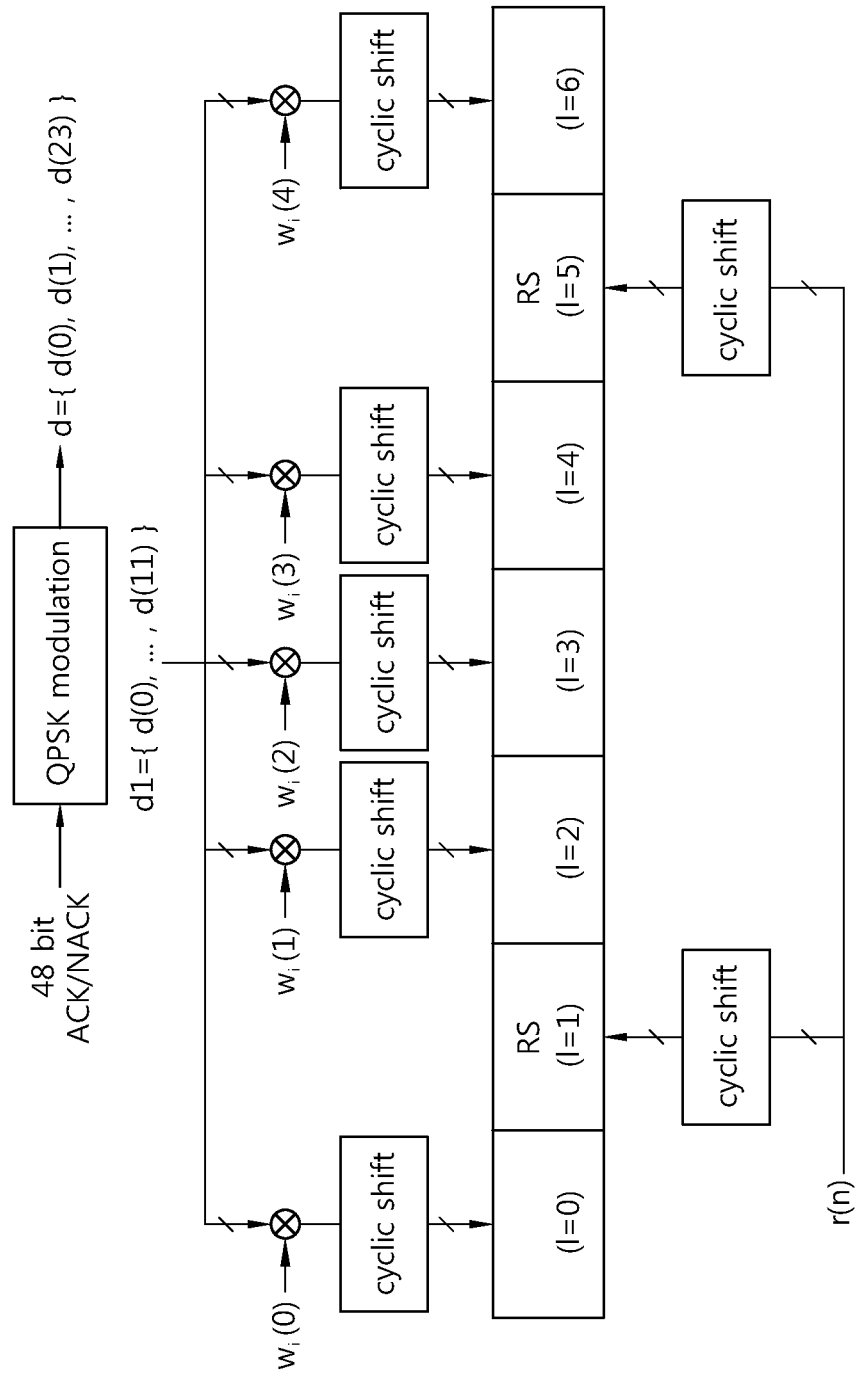
FIG. 5 shows an example of a structure of a PUCCH format 3 in a normal CP.

FIG. 5 shows an example of a structure of a PUCCH format 3 in a normal CP.

One slot includes 7 OFDM symbols. l denotes an OFDM symbol number, and has a value in the range of 0 to 6. Two OFDM symbols with l=1, 5 are used as RS OFDM symbols for a reference signal, and the remaining OFDM symbols are used as data OFDM symbols for an ACK/NACK signal.

A symbol sequence $d=\{d(0), d(1), \ldots, d(23)\}$ is generated by performing QPSK modulation on a 48-bit encoded ACK/NACK signal. $d(n)$ (n=0, 1, ..., 23) is a complex-valued modulation symbol. The symbol sequence d can be regarded as a set of modulation symbols. The number of bits of the ACK/NACK signal or a modulation scheme is for exemplary purposes only, and thus the present invention is not limited thereto.

One PUCCH uses one RB, and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. FIG. 5 shows that the first sequence d1 is transmitted in the first slot.

The symbol sequence is spread with an orthogonal sequence $w_i$. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of five orthogonal sequences of Table 5 below can be selected according to an orthogonal sequence index i.

TABLE 5

| Index (i) | $[w_i(0), w_i(1), w_i(2), w_i(3), w_i(4)]$ |
|---|---|
| 0 | $[+1, +1, +1, +1, +1]$ |
| 1 | $[+1, e^{j2\pi/5}, e^{j4\pi/5}, e^{j6\pi/5}, e^{j8\pi/5}]$ |
| 2 | $[+1, e^{j4\pi/5}, e^{j8\pi/5}, e^{j2\pi/5}, e^{j6\pi/5}]$ |
| 3 | $[+1, e^{j6\pi/5}, e^{j2\pi/5}, e^{j8\pi/5}, e^{j4\pi/5}]$ |
| 4 | $[+1, e^{j8\pi/5}, e^{j6\pi/5}, e^{j4\pi/5}, e^{j2\pi/5}]$ |

Two slots in the subframe can use different orthogonal sequence indices.

Each spread symbol sequence is cyclically shifted by a cell-specific CS value $n^{cell}_{cs}(n_s,l)$. Each cyclically shifted symbol sequence is transmitted by being mapped to a corresponding data OFDM symbol.

$n^{cell}_{cs}(n_s,l)$ is a cell-specific parameter determined by a pseudo-random sequence which is initialized on the basis of a physical cell identity (PCI). $n^{cell}_{cs}(n_s,l)$ varies depending on a slot number $n_s$ in a radio frame and an OFDM symbol number l in a slot.

Two RS OFDM symbols are transmitted by mapping an RS sequence used for demodulation of an ACK/NACK signal.

As described above, since the ACK/NACK signal is spread with an orthogonal sequence having a spreading factor K=5, up to five UEs can be identified by changing an orthogonal sequence index. This implies that up to five PUCCH formats 3 can be multiplexed in the same RB.

Figure 6:
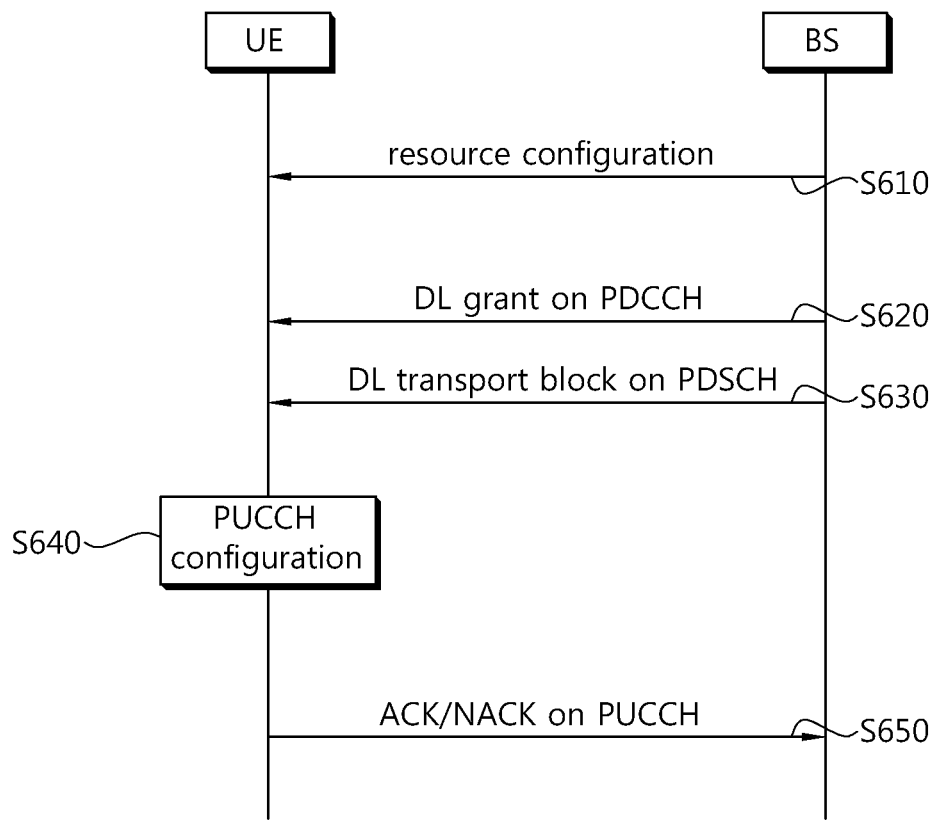
FIG. 6 is a flowchart showing a method of performing HARQ using a PUCCH format 3.

FIG. 6 is a flowchart showing a method of performing HARQ using the PUCCH format 3.

A BS transmits a resource configuration to a UE (step S610). The resource configuration can be transmitted by using a radio resource control (RRC) message for configuring/modification/reconfiguration of a radio bearer.

The resource configuration includes information regarding a plurality of resource index candidates. The plurality of resource index candidates may be a set of resource indices that can be configured to the UE. The resource configuration may include information regarding four resource index candidates.

The BS transmits a DL grant to the UE through a PDCCH (step S620). The DL grant includes a DL resource allocation and a resource index field. The DL resource allocation includes resource allocation information indicating a PDSCH. The resource index field indicates a resource index $n_{PUCCH}$ used to configure a PUCCH among the plurality of resource index candidates. If there are four resource index candidates, the resource index field may have two bits.

The UE receives a DL transport block through a PDSCH on the basis of the DL resource allocation (step S630). The UE generates an HARQ ACK/NACK signal for the DL transport block.

The UE configures the PUCCH on the basis of a resource index (step S640). In the structure of FIG. 5, a PUCCH resource includes an orthogonal sequence index used to spread the ACK/NACK signal and a CS index for a reference signal.

The orthogonal sequence index used to spread the ACK/NACK signal can be obtained as follows.

$$i_1 = n_{PUCCH} \bmod N_{SF}, i_2 = 3i_1 \bmod N_{SF} \quad \text{[Equation 3]}$$

Herein, $i_1$ is an orthogonal sequence index used in a first slot, $i_2$ is an orthogonal sequence index used in a second slot, $N_{SF}$ is a spreading factor of an orthogonal sequence, and $n_{PUCCH}$ is a resource index.

Since the PUCCH is transmitted in one subframe, that is, in two slots, two orthogonal sequence indices are determined. Since one slot includes five data OFDM symbols, $N_{SF}$ is 5.

A CS index Ics for a reference signal is selected from a CS index set {0, 3, 6, 8, 10}. More specifically, a relationship between the orthogonal sequence index and the CS index Ics can be defined by Table 6 below.

TABLE 6

| $i_1$ or $i_2$ | Ics |
|---|---|
| 0 | 0 |
| 1 | 3 |
| 2 | 6 |
| 3 | 8 |
| 4 | 10 |

That is, the orthogonal sequence index and the CS index can be 1:1 mapped.

A cyclic shift for two RS OFDM symbols is obtained on the basis of the CS index. For example, the UE may determine a first CS index $Ics(1)=\{n^{cell}_{cs}(n_s,l)+Ics\} \bmod N$ with respect to an RS OFDM symbol with l=1, and may determine a second CS index $Ics(5)=\{n^{cell}_{cs}(n_s,l)+Ics\} \bmod N$ with respect to an RS OFDM symbol with l=5.

The UE determines a PUCCH resource on the basis of a resource index $n_{PUCCH}$, and configures a PUCCH having the same structure of FIG. 5.

The UE transmits an ACK/NACK signal through the PUCCH (step S650).

Now, a multiple-carrier system will be described.

A 3GPP LTE system supports a case in which a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (or bandwidth aggregation, also referred to as carrier aggregation) supports a plurality of CCs. For example, if 5 CCs are assigned as a granularity of a carrier unit having a bandwidth of 20 MHz, a bandwidth of up to 100 MHz can be supported.

A CC or a CC-pair may be mapped to one cell. When a synchronization signal and a PBCH are transmitted in each CC, it can be said that one DL CC is mapped to one cell. Therefore, when a UE communicates with a BS through a plurality of CCs, it can be said that the UE receives a service from a plurality of serving cells.

Figure 7:
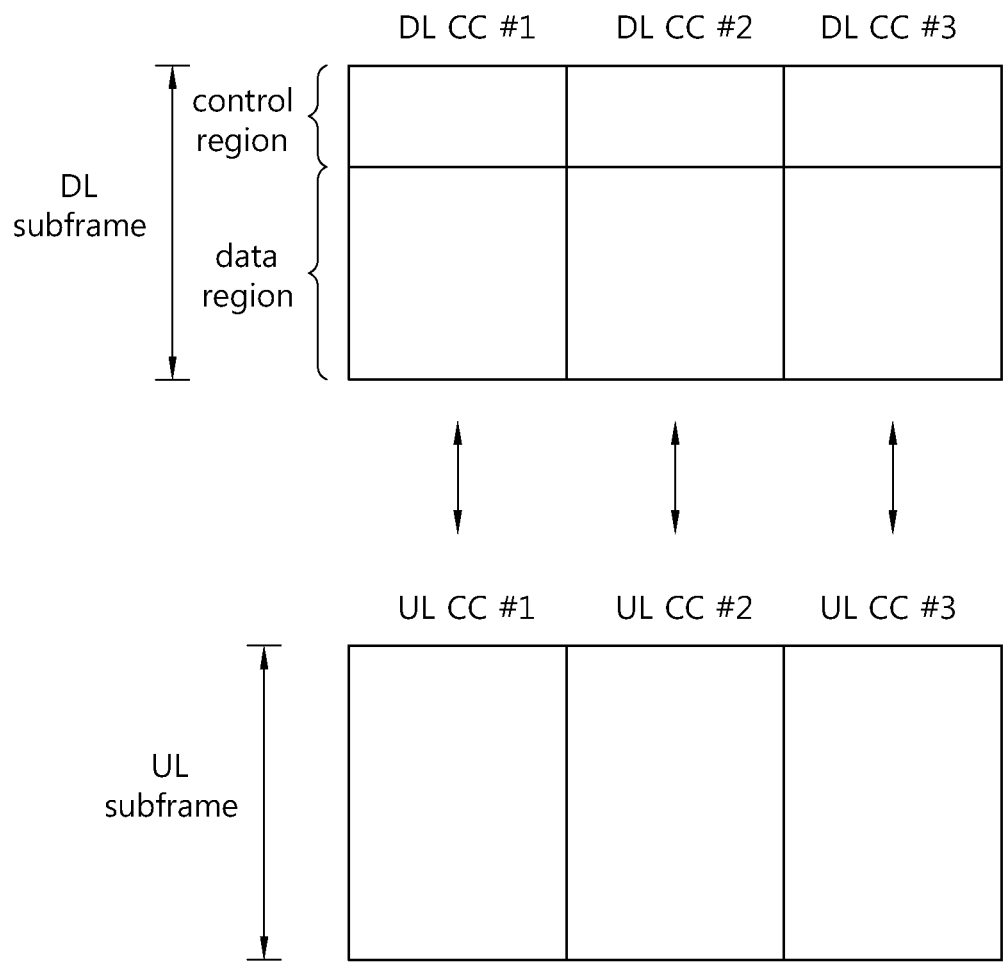
FIG. 7 shows an example of multiple carriers.

FIG. 7 shows an example of multiple carriers.

Although three DL CCs and three UL CCs are shown herein, the number of DL CCs and the number of UL CCs are not limited thereto. A PDCCH and a PDSCH are independently transmitted in each DL CC. A PUCCH and a PUSCH are independently transmitted in each UL CC Since three DL CC-UL CC pairs are defined, it can be said that a UE receives a service from three serving cells.

The UE can monitor the PDCCH in a plurality of DL CCs, and can receive a DL transport block simultaneously through the plurality of DL CC. The UE can transmit a plurality of UL transport blocks simultaneously through a plurality of UL CCs.

Two CC scheduling methods are possible in a multi-carrier system.

First, a PDCCH-PDSCH pair is transmitted in one CC. This CC is called self-scheduling. In addition, this implies that a UL CC in which a PUSCH is transmitted is a CC linked to a DL CC in which a corresponding PDCCH is transmitted. That is, the PDCCH allocates a PDSCH resource on the same CC, or allocates a PUSCH resource on a linked UL CC.

Second, a DL CC in which the PDSCH is transmitted or a UL CC in which the PUSCH is transmitted is determined irrespective of a DL CC in which the PDCCH is transmitted. That is, the PDCCH and the PDSCH are transmitted in different DL CCs, or the PUSCH is transmitted through a UL CC which is not linked to the DL CC in which the PDSCH is transmitted. This is called cross-carrier scheduling. A CC in which the PDCCH is transmitted is called a PDCCH carrier, a monitoring carrier, or a scheduling carrier. A CC in which the PDSCH/PUSCH is transmitted is called a PDSCH/PUSCH carrier or a scheduled carrier.

Figure 8:
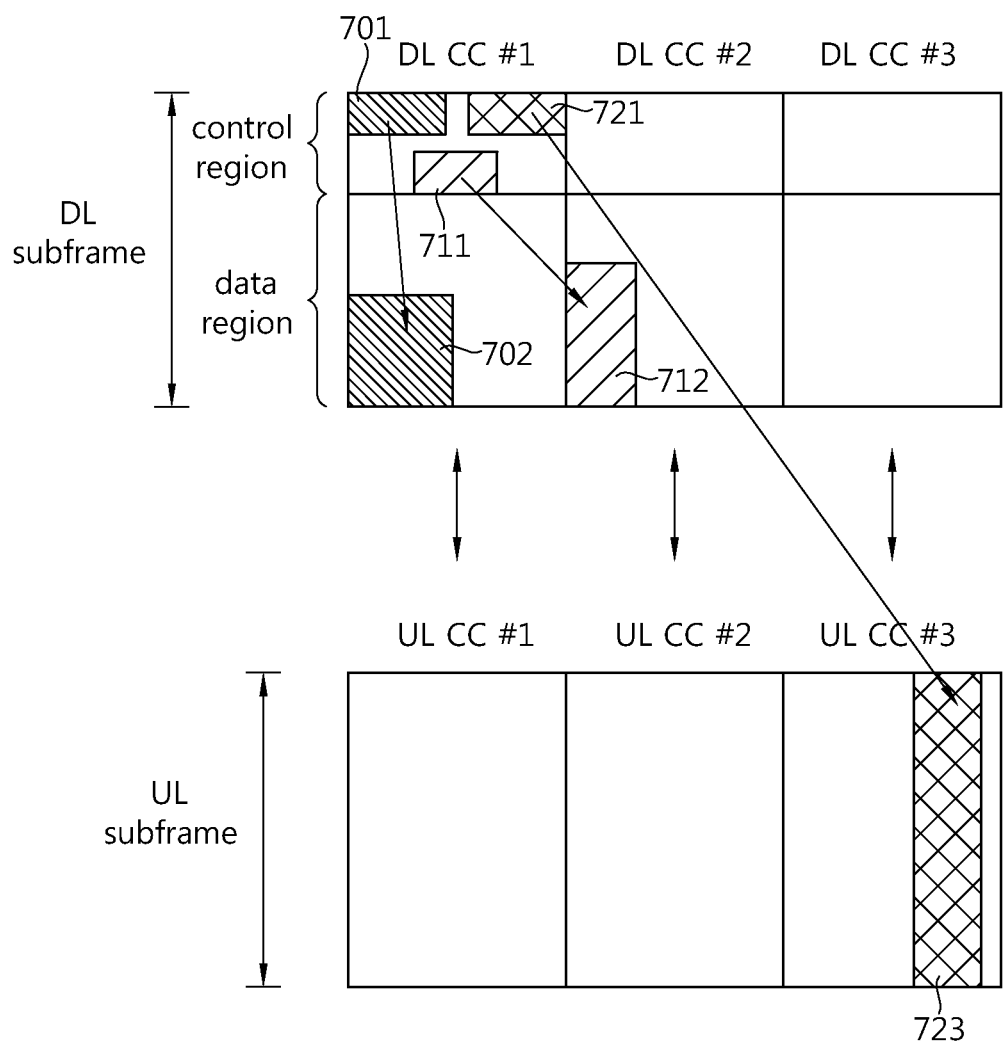
FIG. 8 shows an example of cross-carrier scheduling.

FIG. 8 shows an example of cross-carrier scheduling. It is assumed that a DL CC #1 is linked to a UL CC #1, a DL CC #2 is linked to a UL CC #2, and a DL CC #3 is linked to a UL CC #3.

A $1^{st}$ PDCCH 710 of the DL CC #1 carries DCI for a PDSCH 702 of the same DL CC #1. A $2^{nd}$ PDCCH 711 of the DL CC #1 carries DCI for a PDSCH 712 of the DL CC #2. A $3^{rd}$ PDCCH 721 of the DL CC #1 carries DCI for a PUSCH 722 of the unlinked UL CC #3.

For cross-carrier scheduling, the DCI of the PDCCH may include a carrier indicator field (CIF). The CIF indicates a DL CC or a UL CC scheduled through the DCI. For example, the $2^{nd}$ PDCCH 711 may include a CIF indicating the DL CC #2. The $3^{rd}$ PDCCH 721 may include a CIF indicating the UL CC #3.

Cross-carrier scheduling can be activated/deactivated for each UE. For example, a BS can report to a UE whether the CIF is included in the DCI. When cross-carrier scheduling is activated, the UE can receive the DCI including the CIF. From the CIF included in the DCI, the UE can know a specific scheduled CC for which the received PDCCH is used as control information.

To reduce an overhead caused by PDCCH monitoring, only M (M<N) DL CCs can be monitored even if N DL CCs are supported. A CC for monitoring the PDCCH is called a monitoring CC. A set of monitoring CCs is called a monitoring CC set.

For example, if the DL CC #1 is a monitoring CC and the DL CC #2 and the DL CC #3 are non-monitoring CCs, the UE can perform blind decoding of the PDCCH only in the DL CC #1.

An assigned CC is a CC assigned by the BS to the UE according to the UE capacity among available CCs.

An activated CC is a CC used by the UE to perform reception and/or transmission of a control signal and/or data with respect to the BS. The UE can perform PDCCH monitoring and/or PDSCH buffering with respect to some or all of the activated CCs. The activated CC can be activated or deactivated among the assigned CCs. The activated CC is an activated cell, and is a serving cell.

One of the activated CCs is a reference CC. The reference CC is also called a primary CC or an anchor CC. The reference CC is a CC (or CC-pair) in which information necessary for a system operation is transmitted such as system information and/or multi-carrier operation information. The reference CC is the primary CC or the reference cell.

In the PUCCH structure described with reference to FIG. 3 to FIG. 6, a payload of the PUCCH formats 1a/1b used for transmission of the ACK/NACK signal is 1 bit or 2 bits, and a payload of the PUCCH format 3 is 48 bits.

The PUCCH formats 1a/1b have an advantage in that the great number of UEs are multiplexed. The PUCCH format 3 has an advantage in that capacity of a transmissible ACK/NACK signal is great.

As described above, even if the UE uses a plurality of CCs in a multi-carrier system, scheduling is not always performed through the plurality of CCs. For example, even if three serving cells are activated, a DL grant may be received from only one serving cell.

Although various PUCCH formats are introduced for transmission of the ACK/NACK signal, a specific condition and a specific PUCCH format for use have not been disclosed.

Resource allocation of the PUCCH formats 1a/1b is acquired from a resource of a dynamically linked PDCCH. An ACK/NACK resource acquired from the resource of the dynamically linked PDCCH is called an 'implicit ACK/NACK resource'. Resource allocation of the PUCCH format 3 is directly acquired from a DL grant on a PDCCH. An ACK/NACK pre-allocated to the UE or explicitly allocated to the UE is called an 'explicit ACK/NACK resource'. That is, the explicit ACK/NACK resource is a case where the BS directly reports the ACK/NACK resource to the UE, and the implicit ACK/NACK resource is a case where the BS indirectly reports the ACK/NACK resource to the UE by using a PDCCH resource.

For clarity of explanations, three DL CCs and one UL CC (i.e., three serving cells) are considered hereinafter. However, the number of DL CCs and the number of UL CCs are not limited thereto.

Hereinafter, a DL CC may include an activated DL CC. The DL CC may include a DL CC in which a PDCCH for PDSCH scheduling is transmitted. The DL CC may include a DL CC for monitoring a PDCCH for PDSCH scheduling.

It is assumed that the UE can transmit ACK/NACK through a specific UL CC (referred to as a UL primary component carrier (PCC)) with respect to a plurality of DL transport blocks on a plurality of PDSCHs by using a plurality of DL CCs. That is, in this case, the plurality of DL CCs are linked to one UL PCC.

In this case, a specific DL CC according to which a PUCCH resource of the UL PCC is allocated needs to be taken into account. For example, when the BS performs scheduling to the UE by using three DL CCs, there is an ambiguity regarding a specific DL CC according to which the BS will allocate the ACK/NACK resource.

According to the embodiment of the present invention, it is proposed that the BS pre-allocates the ACK/NACK resource on the basis of a DL CC having the maximum number of CCEs among the plurality of DL CCs. The UE can implicitly determine the ACK/NACK resource according to a CCE used for a PDCCH of a DL CC having the maximum number of CCEs.

The maximum number of CCEs that can be used in each subframe with respect to the plurality of DL CCs may vary since a bandwidth of each CC, a size of a control region, etc., are different.

Figure 9:
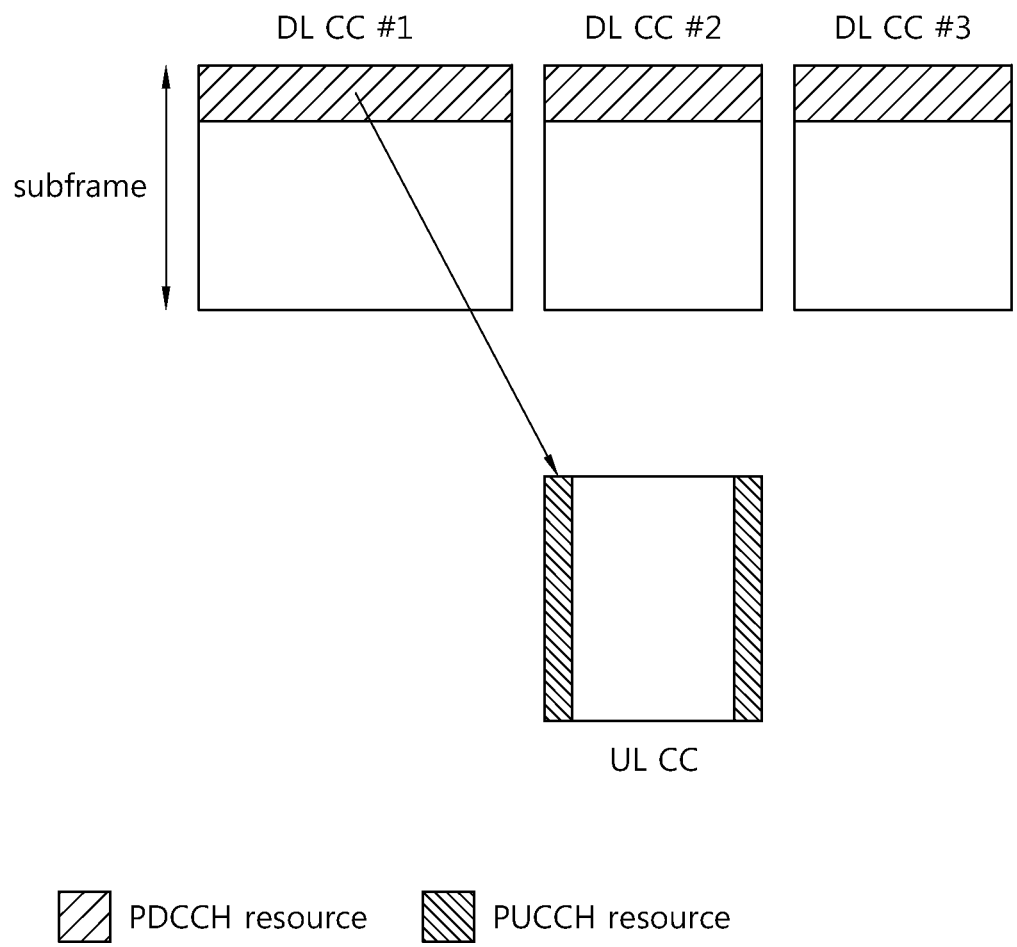
FIG. 9 shows a method of transmitting a reception acknowledgement according to an embodiment of the present invention.

FIG. 9 shows a method of transmitting a reception acknowledgement according to an embodiment of the present invention.

Among a DL CC #1, a DL CC #2, and a DL CC #3, the DL CC #1 has the greatest bandwidth, and has the greatest number of CCEs per subframe.

It is assumed that the DL CC #1 has 100 CCEs, and the DL CCs #2 and #3 have 50 CCEs. A BS secures in advance an ACK/NACK resource according to the 100 CCEs. The BS configures a PDCCH according to the number of CCEs of the DL CC #1. A UE can acquire an implicit ACK/NACK resource from the received PDCCH resource.

Figure 10:
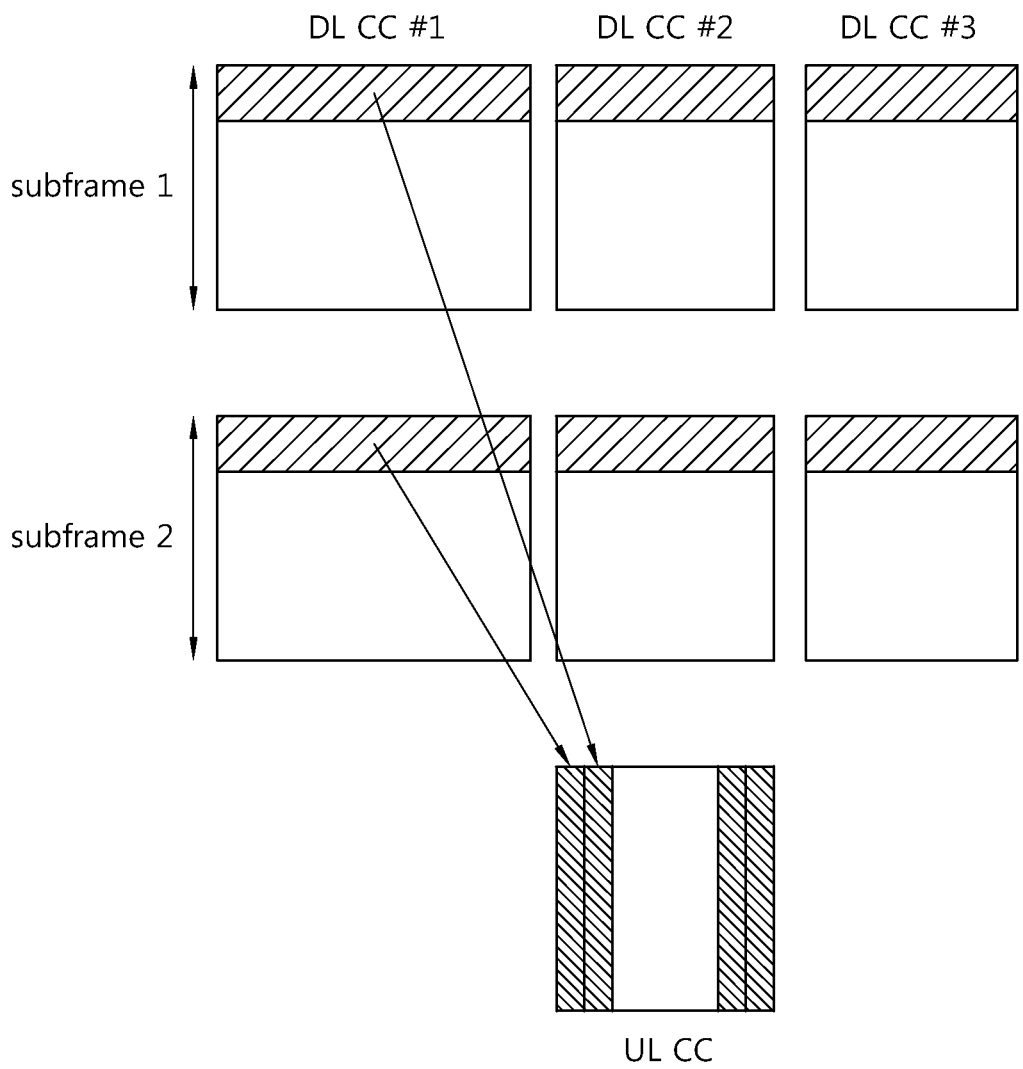
FIG. 10 shows a method of transmitting a reception acknowledgement according to an embodiment of the present invention.

FIG. 10 shows a method of transmitting a reception acknowledgement according to an embodiment of the present invention. This is an example of a TDD system.

It is considered a case in which two DL subframes are mapped to one UL subframe in each DL CC.

Among a DL CC #1, a DL CC #2, and a DL CC #3, the DL CC #1 has the greatest bandwidth and has the greatest CCEs per subframe. Therefore, a BS pre-allocates an ACK/NACK resource according to the maximum number of CCEs of the DL CC #1.

If the ACK/NACK signal requires a great bit size, the PUCCH format 3 can be used by utilizing an explicit ACK/NACK resource. For example, in TDD, the ACK/NACK signal can be transmitted by using one UL PCC with respect to DL transport blocks received through a plurality of DL subframes for a plurality of DL CCs. Therefore, a UE can be basically configured to utilize the explicit ACK/NACK resource.

However, it may be undesirable to always use the explicit ACK/NACK resource in a TDD system under the plurality of DL CCs.

Figure 11:
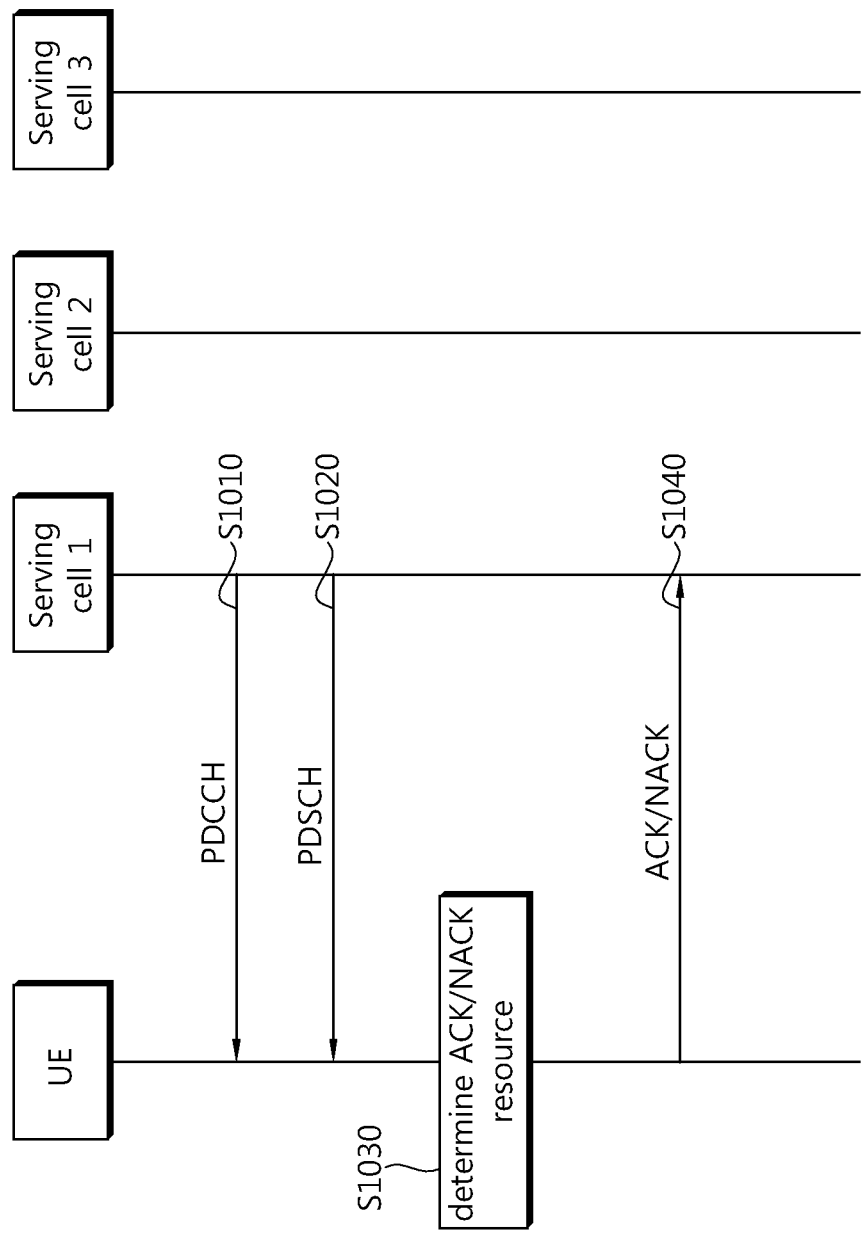
FIG. 11 shows a method of transmitting a reception acknowledgement according to an embodiment of the present invention.

FIG. 11 shows a method of transmitting a reception acknowledgement according to an embodiment of the present invention.

A UE receives a DL grant on a PDCCH from at least one serving cell among a plurality of serving cells (step S1010). The UE receives a DL transport block on a PDSCH indicated by the DL grant (step S1020).

The UE determines an ACK/NACK resource used for transmission of the ACK/NACK resource for the DL transport block (step S1030). The UE can determine an explicit ACK/NACK resource or an implicit ACK/NACK resource.

The UE transmits the ACK/NACK signal on a PUCCH by using the determined ACK/NACK resource (step S1040).

When a TDD system is used and scheduling is performed in each serving cell by using a plurality of subframes, the ACK/NACK signal may be a multiplexed ACK/NACK signal or a bundled ACK/NACK signal. The multiplexed ACK/NACK signal is a signal configured by multiplexing ACK/NACK signals for a plurality of DL transport blocks received through the plurality of subframes, and can be implemented through ACK/NACK multiplexing as shown in Table 4 above. The bundled ACK/NACK signal is a signal configured by bundling ACK/NACK signals for the plurality of DL transport blocks received through the plurality of subframes into one ACK/NACK signal (e.g., a 1-bit ACK/NACK signal).

When an explicit ACK/NACK resource is determined, the UE can transmit the ACK/NACK signal by using the PUCCH format 3. For example, the UE can configure the PUCCH format 3 by using a resource index included in a DL grant.

When an implicit ACK/NACK resource is determined, the ACK/NACK signal can be transmitted by using ACK/NACK multiplexing or ACK/NACK bundling. For example, when three linked resource indices are acquired in three subframes, as shown in Table 4, the ACK/NACK signal can be transmitted by using ACK/NACK multiplexing. The bundled ACK/NACK can be transmitted by using the aforementioned PUCCH format 1a or 1b.

The following description is about which resource will be used between the explicit ACK/NACK resource and the implicit ACK/NACK resource.

In a first embodiment, a UE can use the implicit ACK/NACK resource when only one DL CC is activated, and can use the explicit ACK/NACK resource when a plurality of DL CCs are activated. The UE can use the implicit ACK/NACK resource when only one serving cell is activated, and can use the explicit ACK/NACK resource when a plurality of serving cells are activated.

In a second embodiment, even if a plurality of DL CCs are activated, the UE uses the implicit ACK/NACK resource when a PDCCH and/or a PDSCH are received from one DL CC. The DL CC may be based on a TDD in which a plurality of DL subframes are mapped to one ACK/NACK subframe. The ACK/NACK subframe is a UL subframe in which an ACK/NACK signal for the plurality of DL subframes is transmitted. Upon receiving the PDCCH and/or the PDSCH from the plurality of DL CCs, the explicit ACK/NACK resource is used. The UE can use the implicit ACK/NACK resource when scheduling is performed by one serving cell, and can use the explicit ACK/NACK resource when scheduling is performed by a plurality of serving cells.

In this method, even though a BS schedules the PDSCH in the plurality of DL CCs, if the UE fails to monitor the PDCCH, it may be wrongly determined that the PDSCH is scheduled in one DL CC. Therefore, the BS may report information related to the scheduled DL CC (such information is called a scheduling indicator) to the UE. For example, a 1-bit scheduling indicator can indicate whether scheduling is performed in one DL CC or a plurality of DL CCs. The scheduling indicator may be included in a DL grant on the PDCCH.

In a third embodiment, even if a plurality of DL CCs are activated, the UE uses the implicit ACK/NACK resource when the PDCCH and/or the PDSCH are received from only one specific DL CC. When the PDCCH and/or the PDSCH are received from one DL CC other than the specific DL CC or from a plurality of DL CCs, the UE uses the explicit ACK/NACK resource. The specific DL CC may be a reference CC or a primary CC. The specific DL CC may be based on a TDD in which a plurality of DL subframes are mapped to one ACK/NACK subframe. The ACK/NACK subframe is a UL subframe in which an ACK/NACK signal for the plurality of DL subframes is transmitted. The UE can use the implicit ACK/NACK resource when scheduling is performed by only the primary cell, and can use the explicit ACK/NACK resource when scheduling is performed by one serving cell other than the primary cell or by a plurality of serving cells.

In this method, if the UE detects an ACK/NACK resource by searching both pre-allocated PUCCH resources (i.e., explicit ACK/NACK resources) and PUCCH resources linked to a CCE of a PDCCH received through the primary cell (i.e., implicit ACK/NACK resources), there is an advantage in that the scheduling indicator of the second embodiment may not be necessary.

The BS can report to the UE about whether to use only the explicit ACK/NACK resource, whether to use only the implicit ACK/NACK resource, and/or whether to selectively use the explicit ACK/NACK resource and the implicit ACK/NACK resource.

Although transmission of the ACK/NACK signal for DL HARQ is described in the aforementioned embodiment, technical features of the present invention are also applicable to various cases of transmitting a reception acknowledgement. The reception acknowledgement indicates a signal for reporting to a transmitter about whether a receiver receives data transmitted by the transmitter.

The reception acknowledgement may include an ACK/NACK signal for control information on the PDCCH in addition to an ACK/NACK signal for the DL transport block on the PDSCH. For example, in semi persistence scheduling (SPS) of 3GPP LTE, a DL resource allocation is delivered in advance by the BS to the UE through an RRC message. Then, the BS instructs activation/deactivation of the SPS through the PDCCH. The technical features of the present invention are also applicable to transmission of an ACK/NACK signal for activation/deactivation of the SPS.

Figure 12:
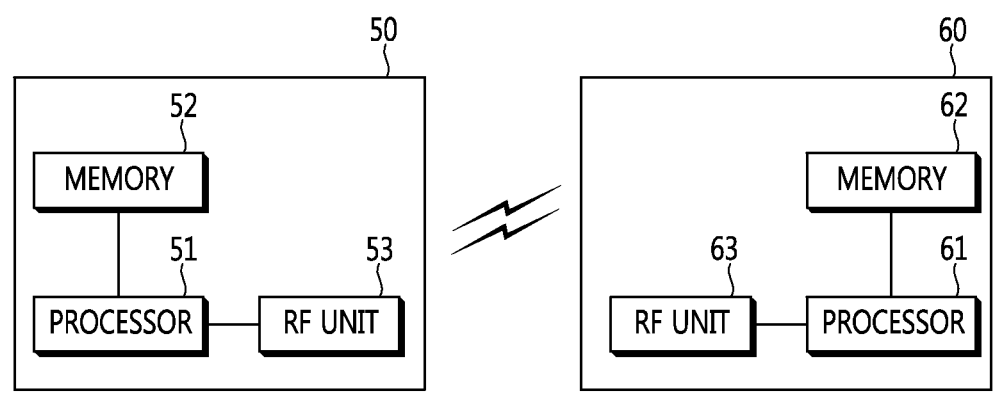
FIG. 12 is a block diagram showing a wireless communication system for implementing an embodiment of the present invention.

FIG. 12 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes, and/or methods. In the aforementioned embodiments, the operation of the BS 50 can be implemented by the processor 51. The processor 51 manages multiple cells, schedules a PDCCH and a PDSCH, and receives a reception acknowledgement from a UE 60.

The UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, processes, and/or methods. In the aforementioned embodiments, the operation of the UE 60 can be implemented by the processor 61. The processor 61 manages multiple cells, determines an ACK/NACK resource used for transmission of a reception acknowledgement, and transmits the reception acknowledgement by using the determined ACK/NACK resource.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method of transmitting acknowledgements in a wireless communication system, the method comprising:
   receiving by a user equipment a plurality of downlink transport blocks from a plurality of serving cells;
   selecting, by the user equipment, one of an explicit resource and an implicit resource; and
   transmitting, by the user equipment, acknowledgements for the plurality of downlink transport blocks by using the selected resource,
   wherein the explicit resource is acquired from one of plural downlink resource allocations used to receive the plurality of downlink transport blocks, and
   wherein the implicit resource is determined based on a greatest number of control channel elements (CCEs) used to receive control channels for the plural downlink resource allocations.

2. The method of claim 1, wherein the selecting of at least one of the explicit resource and the implicit resource comprises:
   when the plurality of downlink transport blocks are received from one of the plurality of serving cells, selecting the implicit resource.

3. The method of claim 2, wherein the serving cell is a primary cell.

4. The method of claim 3, wherein the acknowledgements include a hybrid automatic repeat request (HARQ) positive-acknowledgement (ACK)/negative-acknowledgement (NACK) signal for a plurality of downlink transport blocks received in a plurality of downlink subframes through the primary cell.

5. The method of claim 4, wherein the wireless communication system is based on time division duplex (TDD).

6. The method of claim 2, wherein the selecting of one of the explicit resource and the implicit resource comprises:
   when the plurality of downlink transport blocks are received from the plurality of serving cells, selecting the explicit resource.

7. The method of claim 2, wherein if the selected resource is the explicit resource, the transmitting of the acknowledgements comprises:
   generating a modulation sequence by modulating the acknowledgements;
   determining a cyclic shift value on the basis of the explicit resource;
   cyclically shifting the modulation sequence by the cyclic shift value; and
   transmitting the cyclically shifted sequence.

8. The method of claim 2, wherein if the selected resource is the implicit resource, the transmitting of the acknowledgements comprises:
   generating a modulation symbol by modulating the acknowledgements;
   determining a cyclic shift value on the basis of the implicit resource;
   generating a cyclically shifted sequence by cyclically shifting a base sequence by the cyclic shift value;
   spreading the modulation symbol to the cyclically shifted sequence; and
   transmitting the spread sequence.

9. A user equipment for transmitting acknowledgements in a wireless communication system, the user equipment comprising:

a radio frequency (RF) unit configured to transmit and receive a radio signal; and a processor operatively coupled to the RF unit and configured to:

receive a plurality of downlink transport blocks from a plurality of serving cells;

select one of an explicit resource and an implicit resource; and transmit acknowledgements for the plurality of downlink transport blocks by using the selected resource, wherein the explicit resource is acquired from one of plural downlink resource allocations used to receive the plurality of downlink transport blocks, and wherein the implicit resource is determined based on a greatest number of control channel elements (CCEs) used to receive control channels for the plural downlink resource allocations.

10. The user equipment of claim 9, wherein when the plurality of downlink transport blocks are received from one of the plurality of serving cells, the processor is configured to select the implicit resource.

11. The user equipment of claim 10, wherein the serving cell is a primary cell.

12. The user equipment of claim 11, wherein the acknowledgements include a hybrid automatic repeat request (HARQ) positive-acknowledgement (ACK)/negative-acknowledgement (NACK) signal for a plurality of downlink transport blocks received in a plurality of downlink subframes through the primary cell.

13. The user equipment of claim 10, wherein when the plurality of downlink transport blocks are received from the plurality of serving cells, the processor is configured to select the explicit resource.

14. The user equipment of claim 10, wherein if the selected resource is the explicit resource, the processor is configured to transmit the acknowledgements by:

generating a modulation sequence by modulating the acknowledgements;

determining a cyclic shift value on the basis of the explicit resource;

cyclically shifting the modulation sequence by the cyclic shift value; and transmitting the cyclically shifted sequence.

15. The user equipment of claim 10, wherein if the selected resource is the implicit resource, the processor is configured to transmit the acknowledgements by:

generating a modulation symbol by modulating the acknowledgements;

determining a cyclic shift value on the basis of the implicit resource;

generating a cyclically shifted sequence by cyclically shifting a base sequence by the cyclic shift value;

spreading the modulation symbol to the cyclically shifted sequence; and transmitting the spread sequence.

* * * * *